(12) United States Patent
Wang et al.

(10) Patent No.: US 12,392,752 B2
(45) Date of Patent: Aug. 19, 2025

(54) TESTING DEVICE FOR INTERNAL LATERAL CASTING OF SPATIAL K-TYPE INCLINED COLUMN GRID AND THE TESTING METHOD THEREOF

(71) Applicant: Hangzhou City University, Zhejiang (CN)

(72) Inventors: Zhen Wang, Zhejiang (CN); Junting Cheng, Zhejiang (CN); Yang Zhao, Zhejiang (CN); Zhi Ding, Zhejiang (CN); Xuelin Yang, Zhejiang (CN); Mengqin Wu, Zhejiang (CN); Kaiyu Zhu, Zhejiang (CN); Haochuan Qu, Zhejiang (CN)

(73) Assignees: HANGZHOU CITY UNIVERSITY, Zhejiang (CN); ZHEJIANG PROVINCE INSTITUTE OF ARCHITECTURAL DESIGN AND RESEARCH, Zhejiang (CN)

( * ) Notice: Subject to any disclaimer, the term of this patent is extended or adjusted under 35 U.S.C. 154(b) by 343 days.

(21) Appl. No.: 18/174,081

(22) Filed: Feb. 24, 2023

(65) Prior Publication Data
US 2024/0053299 A1 Feb. 15, 2024

(30) Foreign Application Priority Data
Jul. 22, 2022 (CN) .......................... 202210865827.3

(51) Int. Cl.
*G01N 29/06* (2006.01)
*E04B 1/30* (2006.01)
(Continued)

(52) U.S. Cl.
CPC ........... *G01N 29/0672* (2013.01); *E04B 1/30* (2013.01); *G01N 29/045* (2013.01); *G01N 29/07* (2013.01);
(Continued)

(58) Field of Classification Search
CPC .. G01N 29/045; G01N 29/0672; G01N 29/07; G01N 29/223; G01N 2291/02818;
(Continued)

(56) References Cited

U.S. PATENT DOCUMENTS

| 3,336,718 | A | * | 8/1967 | Cape | .......................... | E04B 5/14 |
| | | | | | | 52/694 |
| 3,641,303 | A | * | 2/1972 | Collins | .................. | B21D 47/04 |
| | | | | | | 219/56 |

(Continued)

FOREIGN PATENT DOCUMENTS

WO WO-2017121315 A1 * 7/2017 ............... E04B 1/19

*Primary Examiner* — Helen C Kwok (57) ABSTRACT

A testing device for the internal lateral casting of spatial K-type inclined column grid and the testing method thereof comprises steps: constructing a testing device for the internal lateral casting of spatial K-type inclined column grid; selecting the testing location of the inclined column cross-section; obtaining imaging results of the inclined column cross-section testing locations; determining the concrete quality and taking supplementary testing. The clear module and force transferring route carry out vertical support and column-base fixed limiting measure through overturn-preventing supporting frame and anchoring limiting basis, realize concrete lateral casting and intensity distribution imaging testing through peripheral framework platform and imaging detection device, to effectively improve the lateral casting technology and guarantee bearing performance, realize internal concrete lateral casting construction technology simulation and concrete compactness detection processing simulation, and reach the design intensity and compactness requirement of concrete insides grid inclined column and diagrid cross node.

10 Claims, 9 Drawing Sheets

(51) Int. Cl.
*G01N 29/04* (2006.01)
*G01N 29/07* (2006.01)
*G01N 29/22* (2006.01)

(52) U.S. Cl.
CPC ..... *G01N 29/223* (2013.01); *G01N 2291/011* (2013.01); *G01N 2291/0232* (2013.01); *G01N 2291/0289* (2013.01); *G01N 2291/105* (2013.01)

(58) Field of Classification Search
CPC ... G01N 2291/02827; G01N 2291/011; G01N 2291/0232; G01N 2291/0289; G01N 2291/105; E04B 1/30; E04G 21/02
See application file for complete search history.

(56) References Cited

U.S. PATENT DOCUMENTS

| | | | | |
|---|---|---|---|---|
| 6,973,864 | B1* | 12/2005 | Ahmad | F41H 5/0421 |
| | | | | 89/36.02 |
| 2005/0235590 | A1* | 10/2005 | Pace | E04G 11/44 |
| | | | | 52/263 |
| 2015/0145156 | A1* | 5/2015 | Liu | E04B 5/36 |
| | | | | 264/35 |

\* cited by examiner

TESTING DEVICE FOR INTERNAL LATERAL CASTING OF SPATIAL K-TYPE INCLINED COLUMN GRID AND THE TESTING METHOD THEREOF

1. TECHNICAL FIELD

The invention belongs to the field of structural engineering technology, in particular to a testing device for internal lateral casting of spatial K-type inclined column grid and the testing method thereof.

2. BACKGROUND ART

Diagrid system is a super high-rise steel structure system composed of two-way or three-way inclined column members in the form of cross-connection and rigid connection, which has the advantages of light self-weight, high lateral stiffness and high height with good mechanical properties. The diagrid system is mainly formed by the vertical grid formed by the intersection of inclined column members to withstand the horizontal forces such as earthquake and wind loads. The inclined column members are mainly axial members to achieve great lateral stiffness, and the inclined diagrid system is widely used in super high-rise public buildings of commercial, office and other building functions.

The inclined column members generally adopt box section for space utilization and material economy considerations, and the inclined column members and diagrid cross nodes are often filled with concrete inside, to ensure the stiffness and bearing performance while minimizing the member section. Therefore, the steel pipe and the internal concrete are involved in bearing at the same time, and the quality of the compactness of the internal concrete is an important factor to ensure the mechanical properties of the overall system.

Due to the inclined columns, the complex structure of diagrid cross node and multiple internal partitions of nodes, the actual project of inclined column grid system mainly involves 2 difficulties in terms of ensuring the compactness of concrete casting inside the steel pipe: the concrete casting process, and the compactness testing arrangement scheme.

3. SUMMARY OF THE INVENTION

The purpose of the invention is to overcome the deficiencies in the prior art and provide a testing device for internal lateral casting of spatial K-type inclined column grid and the testing method thereof.

The testing device for internal lateral casting of spatial K-type inclined column grid comprises the upper half of the diagrid cross node, the lower half of the grid inclined column, the overturn-preventing supporting frame, the anchoring limiting basis, the peripheral framework platform and the imaging detection device.

The upper half of the diagrid cross node is provided above, comprising upper inclined column member end I, upper inclined column member end II, lower inclined column member end I, lower inclined column member end II, horizontal steel beam bracket I, horizontal steel beam bracket II and core stiffening plate assembly; upper inclined column member end I and upper inclined column member end II are connected to the top of core stiffening plate assembly, and lower inclined column member end I and lower inclined column member end II are connected to the bottom of core stiffening plate assembly; horizontal steel beam bracket I and horizontal steel beam bracket II are provided on the core stiffening plate assembly.

The lower half of the grid inclined column is provided below, comprising steel pipe inclined column members I and steel pipe inclined column member II provided in oblique crossing, and bottom fixed end plate; steel pipe inclined column member I and steel pipe inclined column member II are butt with lower inclined column member end I and lower inclined column member end II, respectively.

The overturn-preventing supporting frame is provided at the rear side, comprising truss column, truss horizontal beam and diagonal webs; truss columns relate to each other by truss horizontal beam and diagonal webs; upper end joint is provided at the top of truss column and top support transfer girder is provided at the upper end joint.

The anchoring limiting basis is provided at the bottom, comprising the first bottom column base, the second bottom column base and the limit flangings; limit flangings are provided at the side of the first bottom column base and the second bottom column base.

The peripheral framework platform comprises vertical uprights, horizontal supporting bars, steel floor plates and steel inclined ladder; the vertical uprights are vertically connected to the horizontal supporting bars, and the steel floor plates, and steel inclined ladder are provided between the vertical uprights and the horizontal support bars.

The imaging detection device comprises a measuring line layout system and an ultrasonic CT imaging system.

Preferably, lateral casting holes are provided in the inner wall plate of the upper inclined column member end I and the upper inclined column member end II.

The upper inclined column member end I and the upper inclined column member end II are provided with a diaphragm plate at the top cross-section with a first end flow hole; the lower inclined column member end I and the lower inclined column member end II are provided with a cross-sectional plate at the bottom cross-section and second end flow holes; the upper horizontal flange plate circulation holes are provided at the upper flange plate of core stiffening plate assembly, and lower horizontal flange flow holes are provided at the lower flange plate of the core stiffening plate assembly.

Both steel pipe inclined column member I and steel pipe inclined column member II are provided with end diaphragm plate at the top buttress and with upper end flow holes.

Preferably, the bottom fixed end plate is fixed to the first bottom column base by means of bottom embedded elements; the bottom of the overturn-preventing supporting frame is provided with a lower end joint, which is fixed to the second bottom column base through the bottom embedded elements, and the column base joint is provided with a stiffening rib.

The first bottom column base is provided with limit flangings on the side, and the limit flangings on the side of the two the first bottom column bases are perpendicular to each other; the second bottom column base connected to the bottom of the truss column corresponding to the center of gravity of the overall structural model is provided with two limit flangings on the side in perpendicular directions; the bottom of the limit flangings are provided with flanginged planting bar and fixed to the rigid ground.

Preferably, the angle of oblique intersection between the upper inclined column member end I and the upper inclined column member end II is 20° to 80°, and the angle of oblique intersection between the lower inclined column member end I and the lower inclined column member end II is 20° to 80°;

the oblique intersection angle between steel pipe inclined column member I and steel pipe inclined column member II is 20° to 80°, the landing distance of the inclined column member is 6.0 to 15.0 m, and the covered floor height of a single group of diagrid cross nodes is generally 1 to 4 floors; the end sections of the upper inclined column member end I, upper inclined column member end II, lower inclined column member end I and lower inclined column member end II are all box sections with the section side length size of 500 to 1000 mm; the truss column is of round pipe section with cross-sectional diameter of 200 to 300 mm; and the truss horizontal beam and diagonal webs are of round pipe section with cross-sectional diameter of 100 to 200 mm.

The lateral casting holes, first end flow holes, upper horizontal frange flow holes, lower horizontal flange flow holes, second end flow holes and upper end flow holes are oblong with diameters of 200 to 400 mm; the cross-section of the steel pipe inclined column member is a box section with the cross-section side dimension is 500 to 1000 mm.

Preferably, the line layout system comprises a group of steel pipe provided on the opposite side of the exciter of row I, detector of row I and another group of steel pipe provided on the opposite side of the exciter of row II and detector of row II; each arrangement contains 20 to 40 excitation points or 20 to 40 geophones, and the spacing between the knock-out point and the receiving point are 50 to 100 mm.

Preferably, the peripheral framework platform is provided outside, adopting scaffolding steel pipes and finished steel inclined ladders, to build around a spatial K-type inclined column grid overall structural model and overturn-preventing supporting frame.

Preferably, a testing device for internal lateral casting of spatial K-type inclined column grid and the testing method thereof comprises the following steps:
S1. Constructing testing device for internal lateral casting of spatial K-type inclined column grid: combining the upper half of the diagrid cross node and the lower half of the grid inclined column into a spatial K-type inclined column grid overall structural model, to carry out vertical support and column-base fixed limiting measure through overturn-preventing supporting frame and anchoring limiting basis, and built the peripheral framework platform around a spatial K-type inclined column grid overall structural model and overturn-preventing supporting frame.
S2. Selecting the testing location of the inclined column cross section: providing inspection cross-sections at the diagrid cross node detection cross-section and the grid inclined column detection cross-section respectively, and installing the imaging detection device.
S3. Obtaining imaging results of the inclined column cross-section testing locations: obtaining the wave velocity distribution schematic and intensity distribution schematic at the locations of the diagrid cross node detection cross-section and the grid inclined column detection cross-section, respectively.
S4. Determining the concrete quality: achieving the concrete quality requirements when satisfying four judgment parameters; carrying out a comprehensive judgment according to the specific situation when satisfying any three judgment parameters; failing to achieve the concrete quality requirements when having a failure of two or more judgments.
S5. Taking supplementary testing: cutting the testing model for supplementary testing of cracks and voids, wherein the cutting locations comprises the model cutting section I and the model cutting section II.

Preferably, in the S2, the diagrid cross node detection cross-section comprises three typical locations which are the locations below the diaphragm plate, below the lower flange plate and below the upper flange plate in the upper half of the diagrid cross node and the lower half of the inclined column joint; the grid inclined column detection cross-section comprises two typical locations which are the locations below the diaphragm plate at the bottom of the lower half of the grid inclined column and below the lower diaphragm plate in the middle section of the inclined column.

Preferably, in S3, the internal concrete detection is performed by ultrasonic CT imaging detection method, and the detected parameters comprises average wave velocity, wave velocity dispersion, passing rate area and maximum defect scale; the wave velocity distribution schematic diagram is directly obtained by the average wave velocity determination, and the intensity distribution schematic diagram is obtained by the combined determination of the four determination results.

Preferably, in S5, the drilling and grouting method is used for the lack of concrete compactness, to drill and then high-pressure grout with concrete of high strength level at the location lack of compactness, and to weld and seal.

Compared to the prior arts, the disclosure has the following advantages:
(1). The structure system provided by the invention is reasonably constructed with simple and effective process method, which can realize internal concrete lateral casting construction technology simulation and concrete compactness detection processing simulation of K-type diagrid cross nodes and diagonal column mesh members with complex internal partitions, giving full play to the advantages of consistent model, identical conditions and reasonable and effective process of the internal lateral casting testing device and testing method of the spatial K-type inclined column grid.
(2). The invention combines the upper half of the diagrid cross node and the lower half of the grid inclined column into a spatial K-type inclined column grid overall structural model, to carry out vertical support and column-base fixed limiting measure through overturn-preventing supporting frame and anchoring limiting basis and built the peripheral framework platform around a spatial K-type inclined column grid overall structural model and overturn-preventing supporting frame. Therefore, the invention can improve the lateral casting process and ensure bearing performance, to realize internal concrete lateral casting construction technology simulation and concrete compactness detection processing simulation of K-type diagrid cross nodes and diagonal column mesh members with complex internal partitions
(3). The clear module and force transferring route provided by the invention are based on the lateral casting model detection and testing analysis, it is convenient to achieve the control of strength, stress, lateral deformation and cycle ratio by strength distribution imaging, bearing capacity control, overall lateral stiffness and torsion resistance of the overall spatial K-type inclined column grid to further guarantee the reasonable and effective model testing device and testing method.
(4). The invention can effectively achieve the design strength and compactness requirements of internal concrete of the grid inclined columns and diagrid cross nodes, to solve the construction feasibility and effectiveness with multiple difficulties of concrete lateral casting process and compactness testing arrangement scheme. The invention can further apply the same process to the actual engineering structure, and achieve the manufacture cost saving and high construction working efficiency by simplifying the testing method while ensuring the structural stress performance.

4. BRIEF DESCRIPTION OF ACCOMPANY DRAWINGS

FIG. 2 is a schematic diagram showing the side view structure of the device obtained by sectioning at position A-A in FIG. 1a.

FIG. 3 is a sectional diagram showing the bottom plane view of the device obtained by sectioning at position B-B in FIG. 1a.

In the figures, 1. The upper inclined column member end I; 2. The upper inclined column member end II; 3. The lower inclined column member end I; 4. The lower inclined column member end II; 5. The horizontal steel beam bracket I; 6. The horizontal steel beam bracket II; 7. The core stiffening plate assembly; 8. The lateral casting holes; 9. The first end flow holes; 10. The upper horizontal frange flow holes; 11. The lower horizontal flange flow holes; 12. The second end flow holes; 13. The steel pipe inclined column member I; 14. The steel pipe inclined column member II; 15. The upper end flow holes; 16. The bottom fixed end plate; 17. The upper end joint; 18. The lower end joint; 19. The truss column; 20. The truss horizontal beam; 21. The diagonal webs; 22. The top support transfer girder; 23. The first bottom column base; 24. The second bottom column base; 25. The bottom embedded elements; 26. The limit flangings; 27. The flanginged planting bar; 28. The vertical uprights; 29. The horizontal supporting bars; 30. The steel floor plate; 31. The steel inclined ladder; 32. The exciter of row I; 33. The detector of row I; 34. The exciter of row II; 35. The detector of row II; 36. The diagrid cross node detection cross-section; 37. The grid inclined column detection cross-section; 38. The line layout system; 39. The ultrasonic CT imaging system; 40. The wave velocity distribution schematic diagram; 41. The intensity distribution schematic diagram; 42. The model cutting section I; 43. The model cutting section II; 44. The corner spatial K-type node application position; 45. The concrete casting device.

5. SPECIFIC EMBODIMENT OF THE INVENTION

To make the technical solutions provided by the unity model more comprehensible, exemplary embodiments according to the application are described below in detail with reference to the accompanying drawings. Apparently, the described embodiments are merely some embodiments of the application rather than all the embodiments of the application. It should be understood that the application is not limited to the exemplary embodiments described herein. Based on the embodiments in the invention, all other embodiments and modifications obtained by those of ordinary skill in the art without making creative labor fall within the scope of protection of the invention.

Embodiment 1

The design idea of the invention is based on the overall structural model of spatial K-type inclined column grid combined with upper half of the diagrid cross node and the lower half of the grid inclined column, to realize the overall testing device and testing mode of lateral concrete casting and strength distribution imaging detection by imaging detection device: Firstly, combining the upper half of the diagrid cross node and the lower half of the grid inclined column into a spatial K-type inclined column grid overall structural model; secondly, carrying out vertical support and column-base fixed limiting measure through overturn-preventing supporting frame and anchoring limiting basis; thirdly, building the peripheral framework platform around a spatial K-type inclined column grid overall structural model and overturn-preventing supporting frame; finally, ensuring the reasonable and effective overall model testing device and testing method through bearing and compactness performance analysis and control of strength distribution, member stress, lateral stiffness and torsional resistance.

Figure 10:
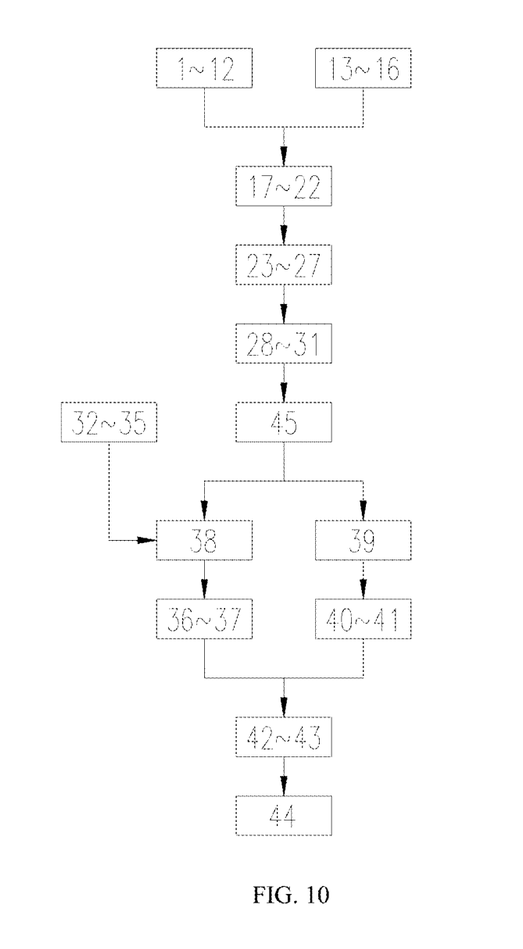
FIG. 10 is a flowchart showing the lateral casting process and the imaging detection method.

As shown in FIG. 10, the flowchart showing the lateral casting process and the imaging detection method of spatial K-type inclined column grid:

S1. Establishing a model testing device for lateral concrete casting inside a spatial K-type inclined column grid, which comprises the upper half of the diagrid cross node, the lower half of the grid inclined column, the overturn-preventing supporting frame, the anchoring limiting basis, the peripheral framework platform and the imaging detection device.

S2. Selecting the testing location of the inclined column cross section: providing inspection cross-sections at the diagrid cross node detection cross-section 36 and the grid inclined column detection cross-section 37 respectively.

S3. The imaging results of the cross-sectional detection position of the inclined column, and the determination parameters comprise the average wave velocity, wave velocity dispersion, passing rate area and maximum defect scale; the wave velocity distribution diagram 40 is obtained directly by the average wave velocity determination, and the intensity distribution diagram 41 is obtained by the combined determination of the four determination results.

S4. Determining the concrete quality: achieving the concrete quality requirements when satisfying four judgment parameters; carrying out a comprehensive judgment according to the specific situation when satisfying any three judgment parameters; failing to achieve the concrete quality requirements when having a failure of two or more judgments.

S5. Cutting the testing model for supplementary testing of cracks and voids, wherein the cutting locations comprises the model cutting section I 42 and the model cutting section II 43.

Embodiment 2

Figure 1A:
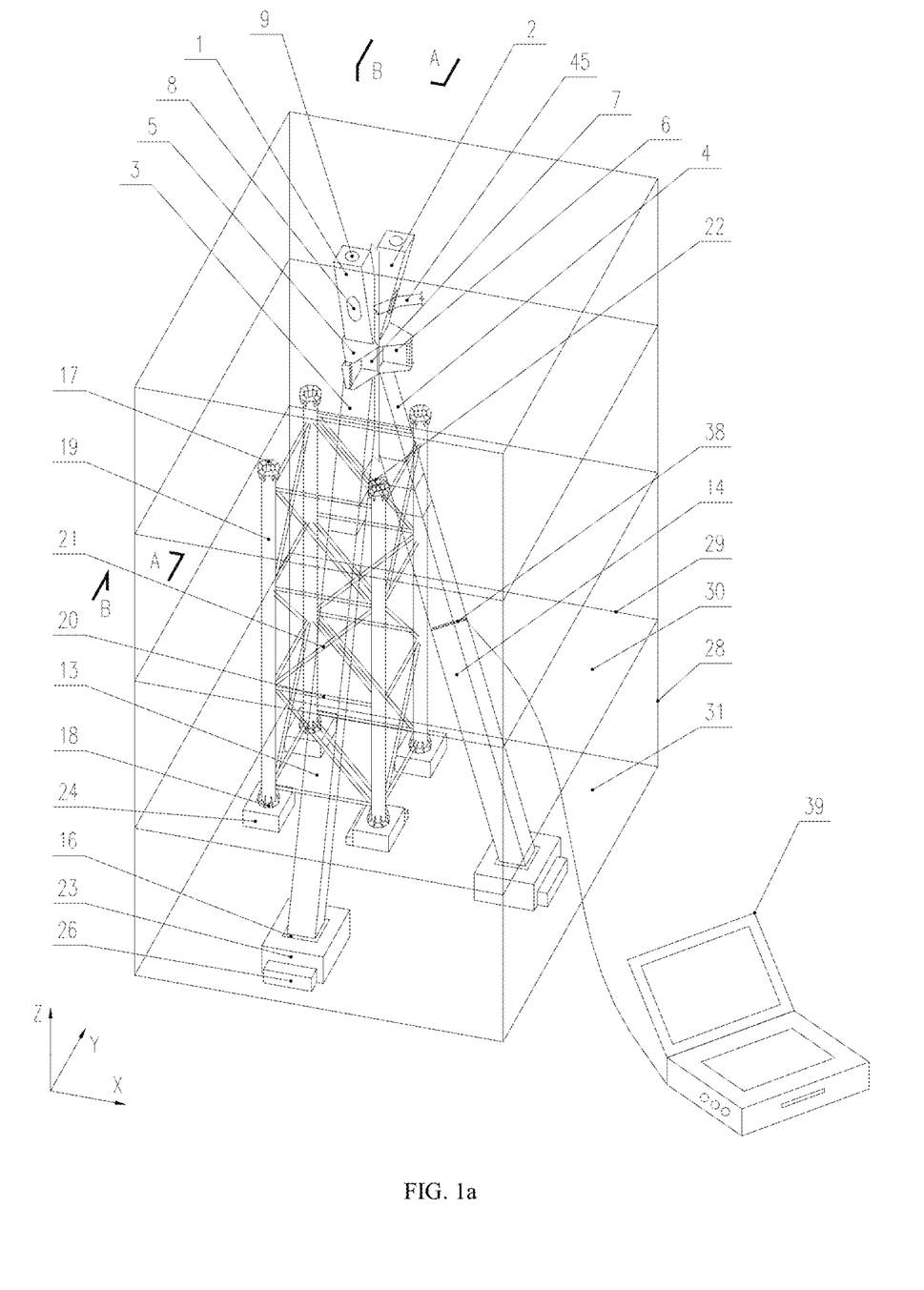
FIG. 1a is a schematic diagram showing the overall structure of the lateral casting testing device inside the spatial K-type inclined column grid.
Figure 1B:
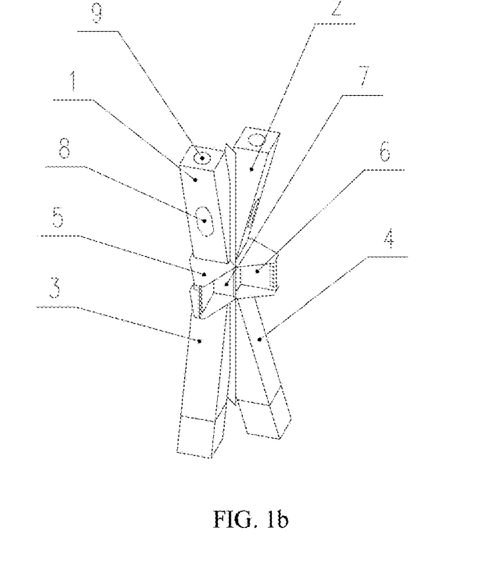
FIG. 1b is a schematic diagram showing the upper half of the diagrid cross nodes.
Figure 1C:
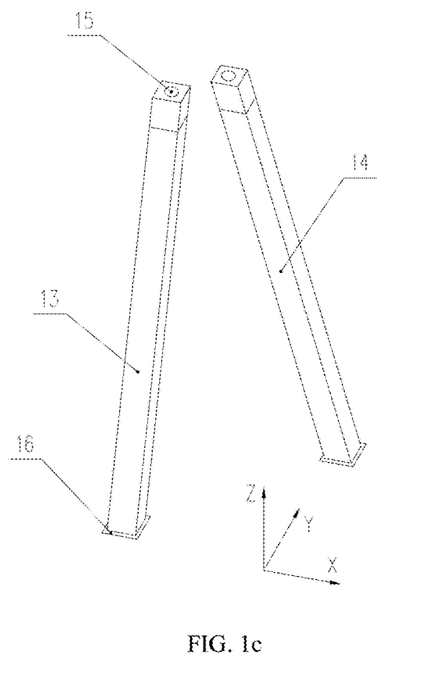
FIG. 1c is a schematic diagram showing the lower half of the grid inclined columns.
Figure 1D:
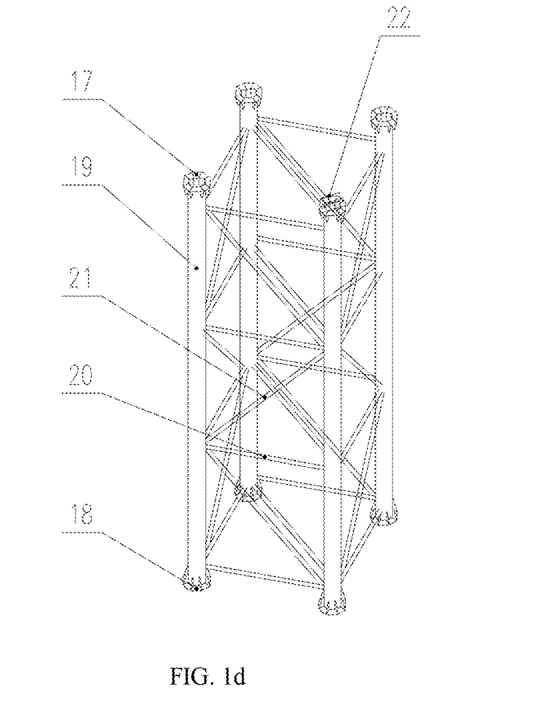
FIG. 1d is a schematic diagram showing the overturn-preventing supporting frame.
Figure 1E:
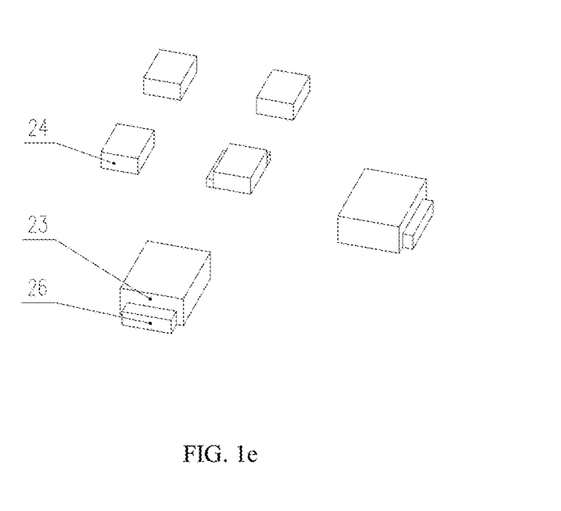
FIG. 1e is a schematic diagram showing the anchoring limiting basis.
Figures 1F, 1G:
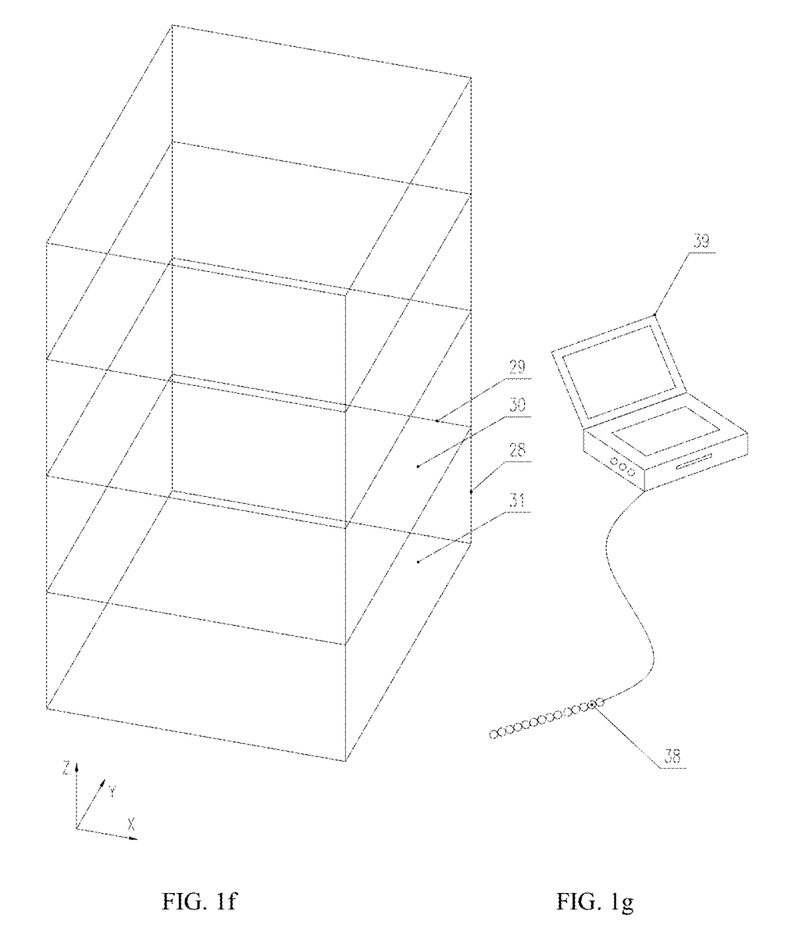
FIG. 1f is a schematic diagram showing the peripheral framework platform.
FIG. 1g is a schematic diagram showing the imaging detection device.
Figure 2:
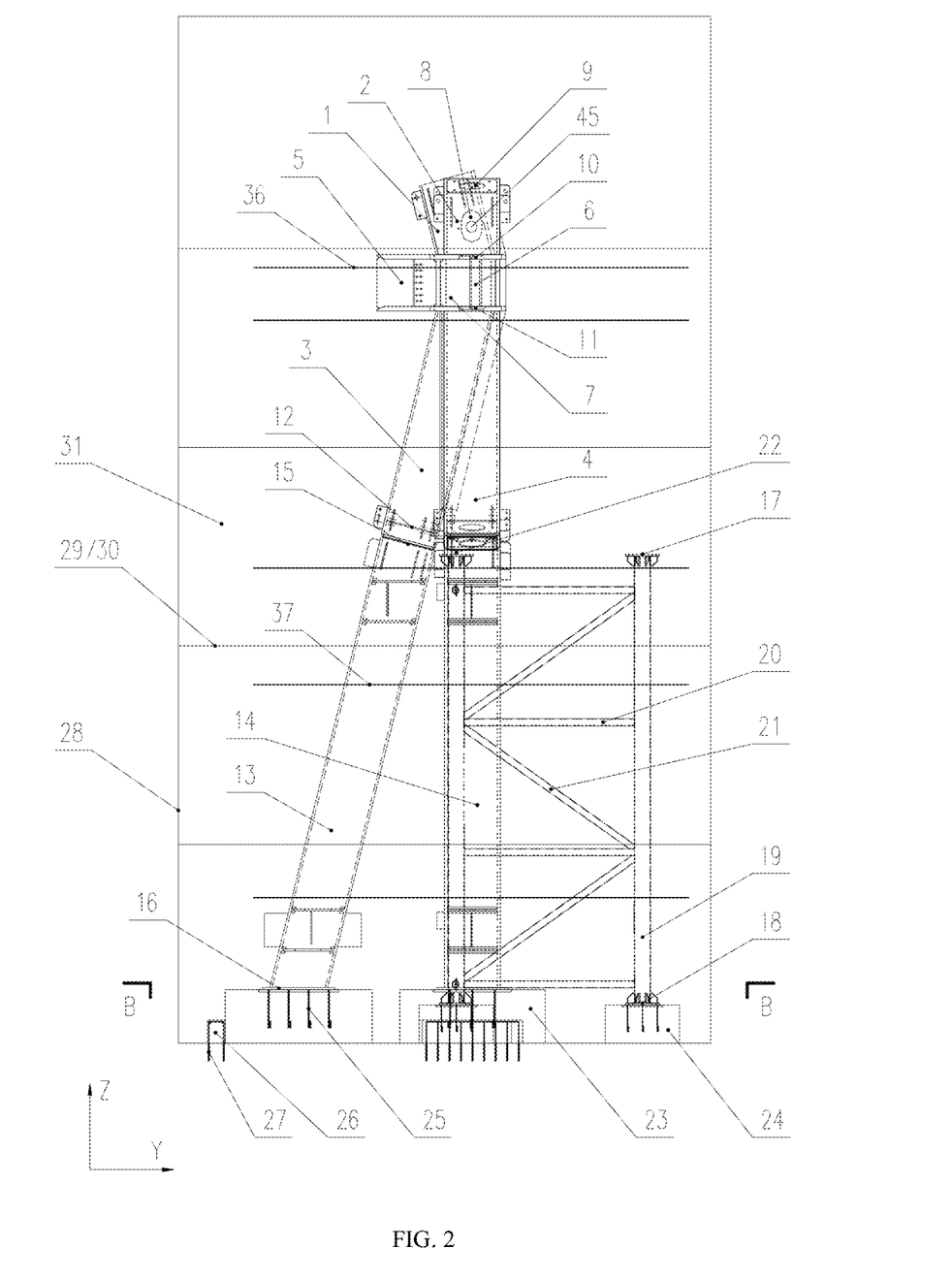
Figure 3:
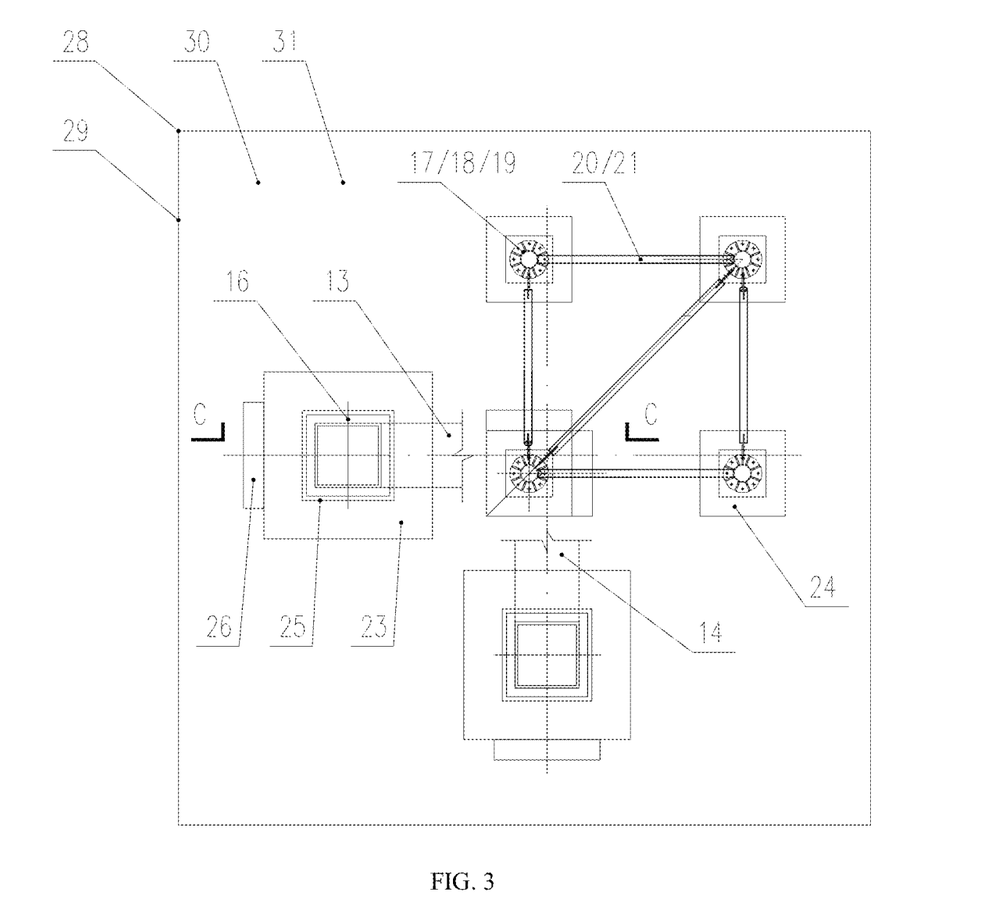
Figure 4A:
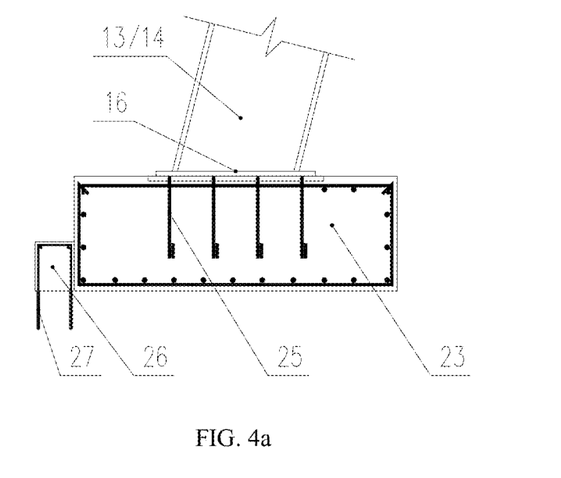
FIG. 4a is a schematic diagram showing a section of the bottom post foot base and limit flap of the lower half of the grid inclined column by sectioning at position C-C in FIG. 3.
Figure 4B:
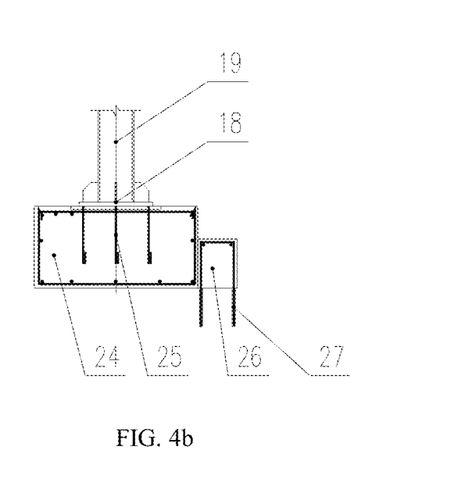
FIG. 4b is a schematic diagram showing the section of the bottom column base and limit flangings of the overturn-preventing supporting frame by sectioning at position C-C in FIG. 3.

A testing device for internal lateral casting of spatial K-type inclined column grid obtained by the embodiment 1 as shown in FIGS. 1a-1g and in FIGS. 2-3, comprises the upper half of the diagrid cross node, the lower half of the grid inclined column, the overturn-preventing supporting frame, the anchoring limiting basis, the peripheral framework platform and the imaging detection device. The upper half of the diagrid cross node is provided above, and the inclined column member end and horizontal steel beam bracket intersect obliquely at the core stiffening plate assembly to form a spatial K-type node, with multiple internal partitions with concrete flow holes provided inside. The lower half of the grid inclined column is provided below, which is composed of two diagonally intersecting steel pipe inclined column members and inclined column base plates, and butted with the inclined column member ends at the upper half of the diagrid cross node to form a spatial K-type inclined column grid integral structural model. The overturn-preventing supporting frame is provided at the rear side as a lateral support structure for the spatial K-type inclined column grid integrated structural model for the prevention of overturning. The anchoring limiting basis is provided at the bottom, comprising the bottom column base of the lower half of the grid inclined column, the bottom column base of the overturn-preventing supporting frame and the limit flangings on the side of the bottom column base, providing vertical support and horizontal limit of the spatial K-type inclined column grid integrated structural model and the overturn-preventing supporting frame. The peripheral framework platform is provided on the outer side, comprising vertical uprights, horizontal supporting bars, steel floor plates and steel inclined ladder, to constitute a working platform for the concrete lateral casting and manual operation of the imaging detection. The imaging detection device (FIG. 1g) comprises a measuring line layout system and an ultrasonic CT imaging system. The line layout system consists of exciter and geophone arranged on opposite sides, and the ultrasonic CT imaging system reflects the density distribution of the internal lateral concrete casting by displaying the imaging results of the strength distribution map.

As shown in FIG. 1b, and FIGS. 2-3, the upper half of the diagrid cross node is formed by the inclined column member end and horizontal steel beam bracket intersecting obliquely at the core stiffening plate assembly to form a spatial K-type node, comprising upper inclined column member end I 1, upper inclined column member end II 2, lower inclined column member end I 3, lower inclined column member end II 4, horizontal steel beam bracket I 5, horizontal steel beam bracket II 6 and core stiffening plate assembly 7 to form the K-type diagrid cross node; the upper half of the diagrid cross node are mainly applied to rigidly connect the upper and lower node levels of the diagrid super high-rise steel structure system to form a grid cylinder lateral force resistant structural system with great lateral stiffness.

As shown in FIG. 1b and FIG. 2, the upper inclined column member end I 1 and the upper inclined column member end II 2 of the upper half of the diagrid cross node are located above the floor level at the node elevation, thus suitable for the lateral casting of internal concrete of the steel pipe; the lateral casting holes 8 are provided on the inner wall plate of the upper inclined column member end I 1 and the upper inclined column member end II 2, enabling the lateral casting of internal concrete of the steel pipe and the installation of the upper steel structure at the same time through the internal lateral casting method, to speed up the construction progress.

As shown in FIGS. 1b and 2, multiple internal partitions with concrete flow holes are provided inside the upper half of the diagrid cross node to achieve effective concrete flow inside the diagrid cross node; the upper inclined column member end I 1 and the upper inclined column member end II 2 are provided with a diaphragm plate at the top cross-section with a first end flow hole 9; the lower inclined column member end I 3 and the lower inclined column member end II 4 are provided with a cross-sectional plate at the bottom cross-section and second end flow holes 12; the upper horizontal flange plate circulation holes 10 are provided at the upper flange plate of core stiffening plate assembly 7, and lower horizontal flange flow holes 11 are provided at the lower flange plate of the core stiffening plate assembly 7.

As shown in FIGS. 1b and 2, the angle of oblique intersection between the upper inclined column member end I 1 and the upper inclined column member end II 2 is 20° to 80°, and the angle of oblique intersection between the lower inclined column member end I 3 and the lower inclined column member end II 4 is 20° to 80°, which are generally correspond to the same; the inclined column member ends are all box sections with the section side length size of 500 to 1000 mm; the lateral casting holes and flow holes are oblong with diameters of 200 to 400 mm; in this embodiment, the angle of oblique intersection is 20°, the side length of the box section is 750 mm, and the diameter of the flow hole is 250 mm.

As shown in FIGS. 1b and 2, due to the large cross-section of the grid inclined column members of the super high-rise diagrid system, with large casting height of each section and multiple nodal reinforcement ribs in the members, high throwing self-compacting concrete is used for lateral casting during construction, and local vibrating method is also considered at the inclined column nodes.

As shown in FIG. 1c, FIGS. 2-3, the lower half of the grid inclined column comprises steel pipe inclined column members 113 and steel pipe inclined column member II 14 provided in oblique crossing, and bottom fixed end plate 16, and butted with the lower inclined column member end I 3 and the lower inclined column member end II 4 at the upper half of the diagrid cross node to form a spatial K-type inclined column grid integral structural model; both steel pipe inclined column member 113 and steel pipe inclined column member II 14 are provided with end diaphragm plate at the top buttress and with upper end flow holes 15.

As shown in FIG. 1c, FIGS. 2-3, the bottom fixed end plate 16 is fixed to the first bottom column base 23 by means of bottom embedded elements 25.

As shown in FIG. 1c, FIGS. 2-3, the oblique intersection angle between steel pipe inclined column member 113 and steel pipe inclined column member II 14 is 20° to 80°, the landing distance of the inclined column member is 6.0 to 15.0 m, and the covered floor height of a single group of diagrid cross nodes is generally 1 to 4 floors; the steel pipe inclined column member end II 4 are box sections with the section side length size of 500 to 1000 mm; In this embodiment, the angle of oblique intersection is 20°, the landing distance is 8.7 m, the height of the covered floor is 4 floors, and the side length of the box section is 750 mm.

As shown in FIGS. 1a-1c and FIGS. 2-3, a 1:1 full-scale K-type inclined column grid internal concrete lateral casting model testing device was produced according to the actual size, with the geometric size and location of the upper half of the diagrid cross nodes, the lower half of the grid inclined column and the internal partition being consistent with the actual project, and the testing platform on site being well fixed. If the lateral casting process of the testing model device achieves the requirement of concrete quality and compactness, the same lateral casting process is used for the actual construction; in this embodiment, a 1:1 full-scale model testing device is produced.

As shown in FIG. 1d, FIGS. 2-3, the overturn-preventing supporting frame is a lateral support structure for the overall structural model to prevent overturning; the structure is in the form of vertical three-dimensional truss structure, comprising truss columns 19, truss horizontal beams 20 and diagonal webs 21; the top of the overturn-preventing supporting frame is provided with upper end joints 17, which support the area near the gravity center height of the overall structural model through the top support transfer girder 22.

As shown in FIG. 1d, FIGS. 2-3, the truss column 19 as the main force member is of round pipe section with cross-sectional diameter of 200 to 300 mm; and the truss horizontal beam 20 and diagonal webs 21 as relatively minor force members are of round pipe section with cross-sectional diameter of 100 to 200 mm; in this embodiment, the cross-sectional diameter size of the truss columns 19 of the overturning-preventing support frame is 250 mm, and the cross-sectional diameter size of the truss horizontal beam 20 and the diagonal webs 21 is 150 mm.

As shown in FIG. 1d, FIGS. 2-3, the bottom of the overturn-preventing supporting frame is provided with a lower end joint 18, which is fixed to the second bottom column base 24 through the bottom embedded elements 25, and the column base joint is provided with a stiffening rib, to achieve rigid connection effect.

As shown in FIG. 1e, FIGS. 2-3, the anchoring limiting basis comprises the first bottom column base 23, the second bottom column base 24 and the limit flangings 26, respectively, serving as the overall structural model, vertical support and horizontal limit of the overturning-preventing support frame.

As shown in FIG. 1c, FIG. 1e, FIGS. 2-3, limit flangings 26 are provided at the sides of the first bottom column bases 23; and both concrete flangings are in the form of long strips, and the flangings are provided perpendicular to each other to limit the lateral movement of the overall structural model in two horizontal directions.

As shown in FIGS. 1d-1e and FIGS. 2-3, the second bottom column bases 24 are provided with limit flangings 26 only at the bottom of the truss column 19 corresponding to the gravity center of the overall structural model, and both concrete flangings are in the form of long strips with the flanging direction provided perpendicular to each other to limit the lateral movement of the overturning-preventing support frame in two horizontal directions.

As shown in FIG. 1e, FIGS. 2-3, and FIGS. 4a-4b, the bottom of the limit flangings 26 are provided with flanginged planting bar 27 and fixed to the rigid ground.

As shown in FIG. 1e, FIGS. 2-3, and FIGS. 4a-4b, the plane side length of the first bottom base 23 and the second bottom base 24 are not less than 2.5 times of the column cross-sectional length, and not less than 3.5 times of the column cross-sectional length when equipped with rigid stiffening ribs, with the plane side length generally of 1000 to 2000 mm, and the base height generally of 500 to 800 mm, with internal configuration of structural reinforcement for strengthening. The plane shape of the limit flanging 26 is a long strip, with the same length or slightly shorter than the edge length of the base of the bottom column, and the height generally ranging from 200 to 300 mm. In this embodiment, the plane side lengths of the first bottom base 23 and the second bottom base 24 are 1950 mm and 1000 mm respectively, and the base heights are 700 mm and 500 mm respectively, and the height of the limit flanging is 300 mm.

As shown in FIG. 1a, FIG. 1f, and FIG. 2, the peripheral framework platform comprises vertical uprights 28, horizontal supporting bars 29, steel floor plates 30 and steel inclined ladder 31, to constitute a working platform for the concrete lateral casting and manual operation of the imaging detection.

As shown in FIG. 1a, FIG. 1f, and FIG. 2, the peripheral framework platform adopts scaffolding steel pipes and finished steel inclined ladders, to save the cost of lateral casting model testing device.

Overall structural model of spatial K-type inclined column grid and the overturning-preventing support frame, which can be assembled by interspersed connection and self-contained structural system to avoid the influence on the quality of internal concrete lateral casting of spatial K-type inclined column grid.

As shown in FIG. 1a and FIG. 2, the lateral casting of internal concrete of the steel pipe is carried out by concrete casting device 45, including concrete transfer pump and vibrating bar, with high performance self-compacting concrete to achieve effective concrete flow inside the diagrid nodes.

Figure 5:
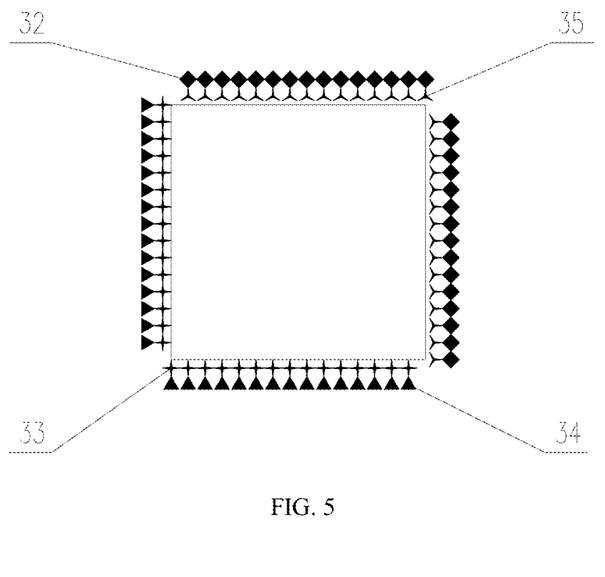
FIG. 5 is a schematic diagram showing the line layout of the imaging detection device.

As shown in FIG. 1a, FIG. 1g, and FIG. 5, the imaging detection device comprises a line layout system 38 and an ultrasonic CT imaging system 39; the line layout system 38 comprises a group of steel pipe provided on the opposite side of the exciter of row I 32, detector of row I 33 and another group of steel pipe provided on the opposite side of the exciter of row II 34 and detector of row II 35, with a total of two sets of excitation points and wave detection points.

As shown in FIG. 1a, FIG. 1g, and FIG. 5, the line layout system is arranged in two arrangements and each arrangement contains 20 to 40 excitation points or 20 to 40 geophones, and the spacing between the knockout point and the receiving point are 50 to 100 mm. In this embodiment, each arrangement contains 30 excitation points and 30 wave detection points, and the spacing between the knockout point and the receiving point is 50 mm.

As shown in FIG. 1a, FIG. 1g, and FIG. 7a-7b, the ultrasonic CT imaging system 39 reflects the density distribution 41 of the internal lateral concrete casting by displaying the imaging results of the strength distribution map.

Figure 6:
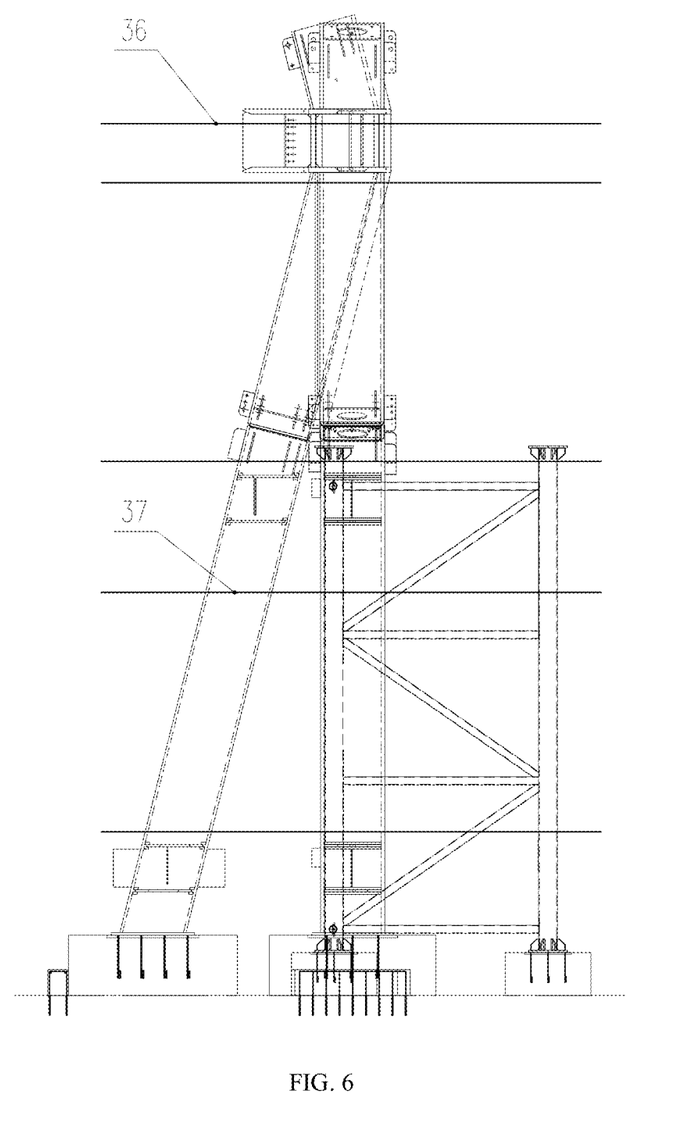
FIG. 6 is a schematic diagram showing the location of the detection cross-section.
Figure 7A:
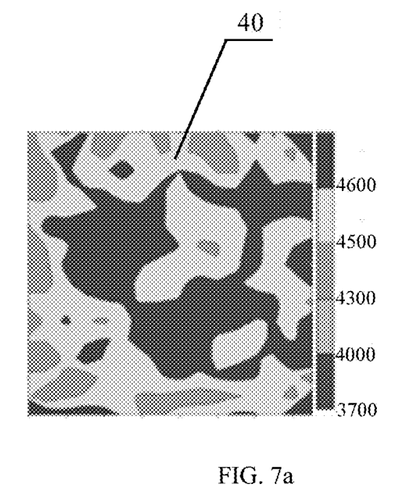
FIG. 7a is a schematic diagram showing the wave velocity distribution of ultrasonic CT imaging results in the embodiment of the detection method.
Figure 7B:
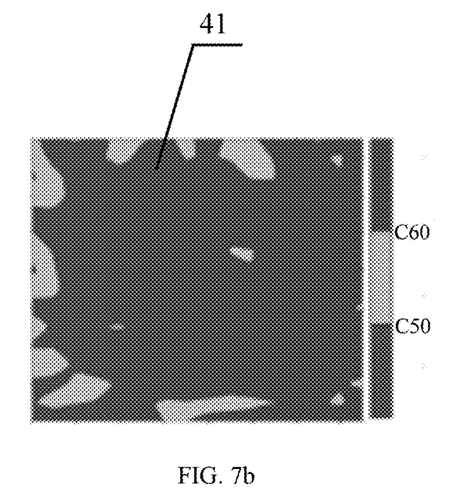
FIG. 7b is a schematic diagram showing the intensity distribution of ultrasonic CT imaging results in the embodiment of the detection method.
Figure 8:
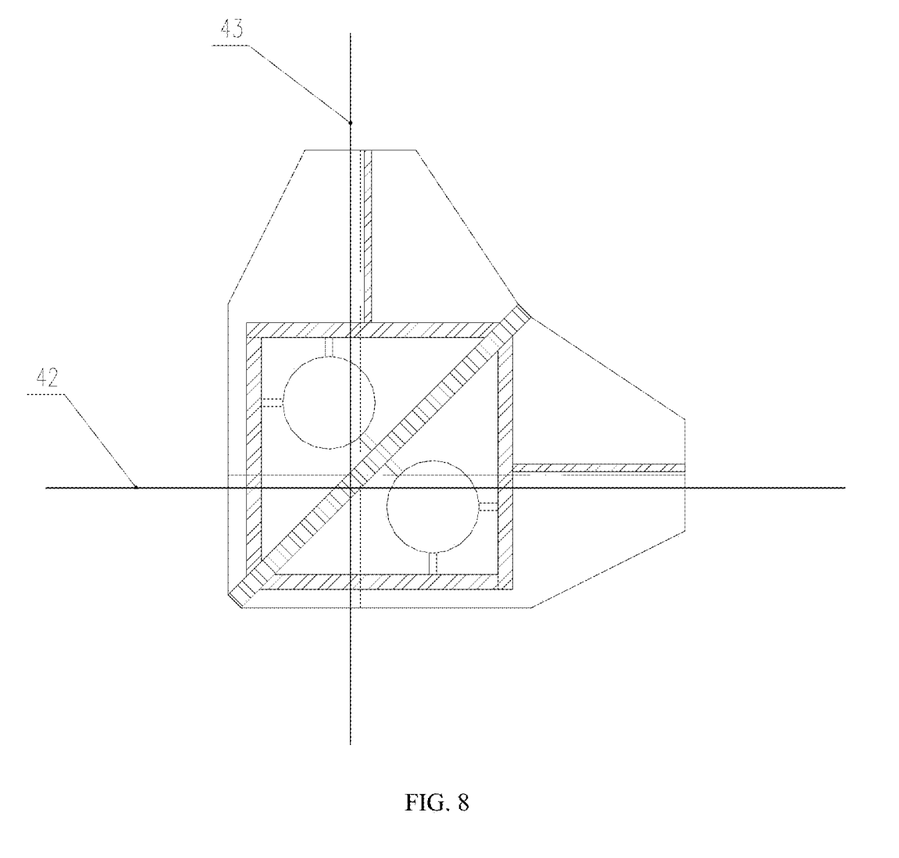
FIG. 8 is a schematic diagram showing the cutting profile arrangement by the model during supplementary testing.

As shown in FIG. 1a, FIG. 2, and FIG. 6, the location of the cross-section detection of the inclined column members comprises the diagrid cross node detection cross-section 36, and the grid inclined column detection cross-section 37; the diagrid cross node detection cross-section 36 comprises three typical locations which are the locations below the diaphragm plate, below the lower flange plate and below the upper flange plate in the upper half of the diagrid cross node and the lower half of the inclined column joint; the grid inclined column detection cross-section 37 comprises two typical locations which are the locations below the diaphragm plate at the bottom of the lower half of the grid inclined column and below the lower diaphragm plate in the middle section of the inclined column.

As shown in FIG. 1a, FIG. 2, FIG. 6 and FIG. 7a-7b, due to the existence of non-uniformity of concrete density in the same detection section, the corresponding concrete wave velocity differs, and the defects are determined by the comprehensive assessment of several statistical parameters; the determination parameters comprise average wave velocity, wave velocity dispersion, passing rate area and maximum defect scale.

As shown in FIG. 1a, FIG. 2, FIG. 6 and FIG. 7a-7b, the wave velocity distribution schematic diagram 40 is directly obtained by the average wave velocity determination, and the intensity distribution schematic diagram 41 is obtained by the combined determination of the four determination results; the results achieve the concrete quality requirements when satisfying four judgment parameters; carrying out a comprehensive judgment according to the specific situation when satisfying any three judgment parameters; failing to achieve the concrete quality requirements when having a failure of two or more judgments.

As shown in FIG. 1a, FIGS. 2-3 and FIG. 8, the testing model can be further cut apart as a supplementary testing method to view more visually the concrete compactness inside the steel pipe, such as cracks and voids; the cutting locations comprises the model cutting section I and the model cutting section II.

The oblique intersection angle between the upper inclined column member ends, the oblique intersection angle between the lower inclined column member ends, the oblique intersection angle between the steel pipe inclined column members, the landing spacing of the inclined column members, the floor height covered by a single group of diagird nodes, the truss structure form of the overturning-preventing support frame, the size of the anchoring limiting basis, and the number of layers of the peripheral framework platform can be adjusted appropriately according to the modeling requirements, functional space, testing model production size and requirements of lateral casting and boundary conditions of the spatial K-type inclined column grid, which will not affect the components composition and concrete quality testing method of the lateral casting testing device inside the spatial K-type inclined column grid provided by the invention.

A testing device for internal lateral casting of spatial K-type inclined column grid and the testing method thereof comprises the clear module and force transferring route, in line with the design principles of overall force, bearing pattern and simple and effective process, giving full play to the advantages of consistent model, identical conditions and reasonable and effective process of the internal lateral casting testing device and testing method of the spatial K-type inclined column grid. The design idea of the invention is based on the overall structural model of spatial K-type inclined column grid combined with upper half of the diagrid cross node and the lower half of the grid inclined column, carrying out vertical support and column-base fixed limiting measure through overturn-preventing supporting frame and anchoring limiting basis, realizing concrete lateral casting and intensity distribution imaging detection through peripheral framework platform and imaging detection device and detect to constitute integrated testing device and detection mode, to realize the lateral concrete casting construction process simulation and concrete compactness testing process simulation inside K-type diagrid with complex internal partitions.

Embodiment 3

Figure 9:
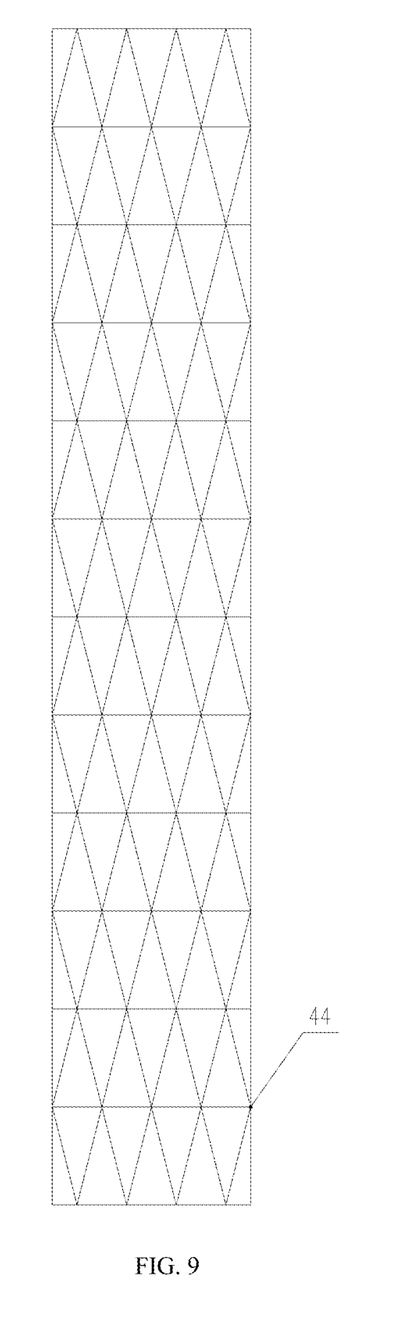
FIG. 9 is a schematic diagram showing the application location of the corner space K-type node.

The invention also provides applications of the lateral concrete casting construction process simulation and concrete compactness testing process simulation inside K-type diagrid with complex internal partitions for the testing device for internal lateral casting of spatial K-type inclined column grid and the testing method thereof, as shown in FIG. 9, application scenarios comprise the corner spatial K-type node application position 44 or other similar cases for the diagrid structural system.

The invention claimed is:

1. A testing device for internal lateral casting of spatial K-type inclined column grid, comprises an upper half of the diagrid cross node, a lower half of the grid inclined column, an overturn-preventing supporting frame, an anchoring limiting basis, a peripheral framework platform and an imaging detection device;

the upper half of the diagrid cross node is provided above, comprising an upper inclined column member end I (1), an upper inclined column member end II (2), a lower inclined column member end I (3), a lower inclined column member end II (4), a horizontal steel beam bracket I (5), a horizontal steel beam bracket II (6) and a core stiffening plate assembly (7); the upper inclined column member end I (1) and the upper inclined column member end II (2) are connected to a top of core stiffening plate assembly (7), and the lower inclined column member end I (3) and the lower inclined column member end II (4) are connected to a bottom of core stiffening plate assembly (7); the horizontal steel beam bracket I (5) and the horizontal steel beam bracket II (6) are provided on the core stiffening plate assembly (7);

the lower half of the grid inclined column is provided below, comprising a steel pipe inclined column member I (13) and a steel pipe inclined column member II (14) provided in oblique crossing, and a bottom fixed end plate (16); the steel pipe inclined column member I (13) and the steel pipe inclined column member II (14) are butt with the lower inclined column member end I (3) and the lower inclined column member end II (4), respectively;

the overturn-preventing supporting frame is provided at a rear side, comprising truss columns (19), a truss horizontal beam (20) and diagonal webs (21); the truss columns (19) are connected with each other by the truss horizontal beam (20) and the diagonal webs (21); the upper end joint (17) is provided at a top of truss column (19) and a top support transfer girder (22) is provided at the upper end joint (17);
the anchoring limiting basis is provided at a bottom, comprising a first bottom column base (23), a second bottom column base (24) and limit flangings (26); the limit flangings (26) are provided at a side of the first bottom column base (23) and the second bottom column base (24);
peripheral framework platform comprises vertical uprights (28), horizontal supporting bars (29), steel floor plates (30) and a steel inclined ladder (31); the vertical uprights (28) are vertically connected to the horizontal supporting bars (29), and the steel floor plates (30) and the steel inclined ladder (31) are provided between the vertical uprights (28) and the horizontal support bars (29);
the imaging detection device comprises a measuring line layout system (38) and an ultrasonic CT imaging system (39).

2. The testing device for internal lateral casting of spatial K-type inclined column grid according to claim 1, wherein lateral casting holes (8) are provided in the inner wall plate of the upper inclined column member end I (1) and the upper inclined column member end II (2); the upper inclined column member end I (1) and the upper inclined column member end II (2) are provided with a diaphragm plate at a top cross-section with a first end flow hole (9); the lower inclined column member end I (3) and the lower inclined column member end II (4) are provided with a cross-sectional plate at a bottom cross-section and second end flow holes (12); upper horizontal flange plate circulation holes (10) are provided at an upper flange plate of core stiffening plate assembly (7), and lower horizontal flange flow holes (11) are provided at a lower flange plate of the core stiffening plate assembly (7); both the steel pipe inclined column member I (13) and the steel pipe inclined column member II (14) are provided with an end diaphragm plate at a top buttress and with upper end flow holes (15).

3. The testing device for internal lateral casting of spatial K-type inclined column grid according to claim 1, wherein the bottom fixed end plate (16) is fixed to the first bottom column base (23) by means of a bottom embedded elements (25); a bottom of the overturn-preventing supporting frame is provided with a lower end joint (18), which is fixed to the second bottom column base (24) through the bottom embedded elements (25), and the column base joint is provided with a stiffening rib;
the first bottom column base (23) is provided with the limit flangings (26) on the side, and the limit flangings (26) on the side of two of the first bottom column bases (23) are perpendicular to each other; the second bottom column base (24) connected to the bottom of the truss columns (19) corresponding to a center of gravity of an overall structural model is provided with two of the limit flangings (26) on the side in perpendicular directions; the bottom of the limit flangings (26) are provided with a flanginged planting bar (27) and fixed to a rigid ground.

4. The testing device for internal lateral casting of spatial K-type inclined column grid according to claim 2, wherein an angle of oblique intersection between the upper inclined column member end I (1) and the upper inclined column member end II (2) is 20° to 80°, and an angle of oblique intersection between the lower inclined column member end I (3) and the lower inclined column member end II (4) is 20° to 80°; an oblique intersection angle between the steel pipe inclined column member I (13) and the steel pipe inclined column member II (14) is 20° to 80°, a landing distance of the lower inclined column member is 6.0 to 15.0 m, and a covered floor height of a single group of diagrid cross nodes is generally 1 to 4 floors; end sections of the upper inclined column member end I (1), the upper inclined column member end II (2), the lower inclined column member end I (3) and the lower inclined column member end II (4) are all box sections with a section side length size of 500 to 1000 mm; the truss columns (19) is of round pipe section with cross-sectional diameter of 200 to 300 mm; and the truss horizontal beam (20) and the diagonal webs (21) are of round pipe section with cross-sectional diameter of 100 to 200 mm;
the lateral casting holes (8), the first end flow hole (9), the upper horizontal flange plate circulation holes (10), the lower horizontal flange flow holes (11), the second end flow holes (12) and the upper end flow holes (15) are oblong with diameters of 200 to 400 mm; a cross-section of the steel pipe inclined column members are a box section with a cross-section side dimension is 500 to 1000 mm.

5. The testing device for internal lateral casting of spatial K-type inclined column grid according to claim 1, wherein the line measuring layout system (38) comprises a group of steel pipe provided on an opposite side of an exciter of row I (32), a detector of row I (33) and another group of steel pipe provided on an opposite side of an exciter of row II (34) and a detector of row II (35); each arrangement contains 20 to 40 excitation points or 20 to 40 geophones, and a spacing between a knockout point and a receiving point are 50 to 100 mm.

6. The testing device for internal lateral casting of spatial K-type inclined column grid according to claim 1, wherein the peripheral framework platform is provided outside, adopting scaffolding steel pipes and finished steel inclined ladders, to build around a spatial K-type inclined column grid overall structural model and the overturn-preventing supporting frame.

7. The testing device for internal lateral casting of spatial K-type inclined column grid and the testing method thereof according to claim 1, comprises the following steps:
S1. constructing the testing device for internal lateral casting of spatial K-type inclined column grid: combining the upper half of the diagrid cross node and the lower half of the grid inclined column into a spatial K-type inclined column grid overall structural model, to carry out vertical support and column-base fixed limiting measure through the overturn-preventing supporting frame and the anchoring limiting basis, and built the peripheral framework platform around the spatial K-type inclined column grid overall structural model and the overturn-preventing supporting frame;
S2. selecting a testing location of an inclined column cross section: providing inspection cross-sections at a diagrid cross node detection cross-section (36) and a grid inclined column detection cross-section (37) respectively, and installing the imaging detection device;
S3. obtaining imaging results of the inclined column cross-section testing locations: obtaining a wave velocity distribution schematic (40) and an intensity distribution schematic (41) at the locations of the diagrid cross node detection cross-section (36) and the grid inclined column detection cross-section (37), respectively;
S4. determining a concrete quality: achieving the concrete quality requirements when satisfying four judgment parameters; carrying out a comprehensive judgment according to the specific situation when satisfying any three judgment parameters; failing to achieve the concrete quality requirements when having a failure of two or more judgments;

S5. taking supplementary testing: cutting a testing model for supplementary testing of cracks and voids, wherein cutting locations comprises a model cutting section I (42) and a model cutting section II (43).

8. The testing device for internal lateral casting of spatial K-type inclined column grid and the testing method thereof according to claim 7, wherein in the S2, the diagrid cross node detection cross-section (36) comprises three typical locations which are the locations below a diaphragm plate, below a lower flange plate and below an upper flange plate in the upper half of the diagrid cross node and the lower half of an inclined column joint; the grid inclined column detection cross-section (37) comprises two typical locations which are the locations below the diaphragm plate at a bottom of a lower half of the grid inclined column and below the lower diaphragm plate in a middle section of the grid inclined column.

9. The testing device for internal lateral casting of spatial K-type inclined column grid and the testing method thereof according to claim 7, wherein in S3, an internal concrete detection is performed by ultrasonic CT imaging detection method, and detected parameters comprises average wave velocity, wave velocity dispersion, passing rate area and maximum defect scale; the wave velocity distribution schematic (40) is directly obtained by the average wave velocity.

10. The testing device for internal lateral casting of spatial K-type inclined column grid and the testing method thereof according to claim 7, wherein in S5, a drilling and grouting method is used for a lack of concrete compactness, to drill and then high-pressure grout with concrete of high strength level at a location lack of compactness, and to weld and seal.

* * * * *